Aug. 8, 1961 E. O. TOLONEN 2,995,177
APPARATUS FOR SPLICING TIRE TREADS
Filed May 16, 1958 2 Sheets-Sheet 1
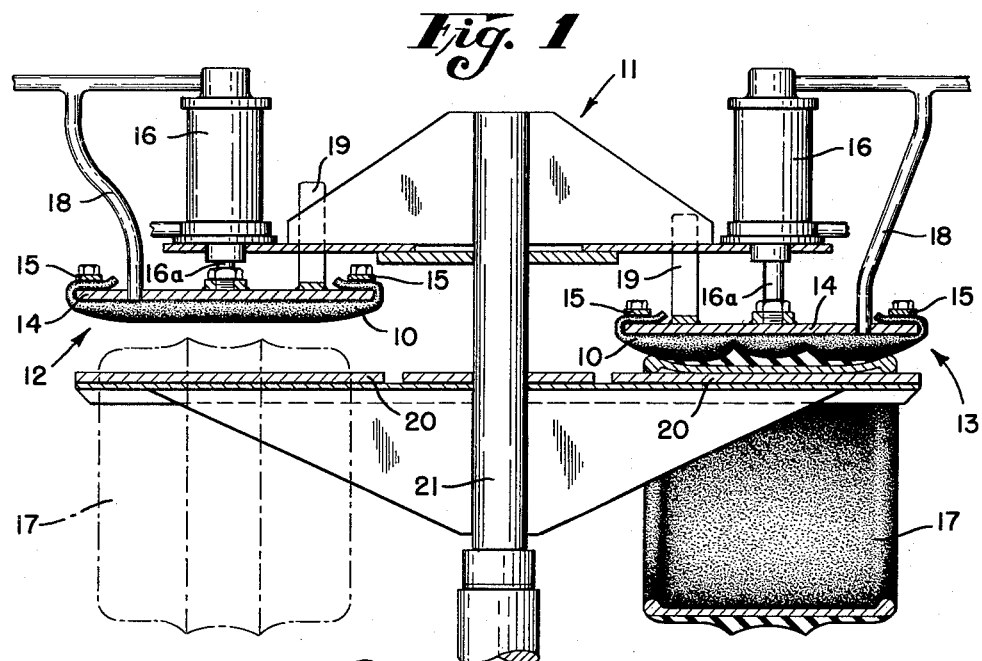
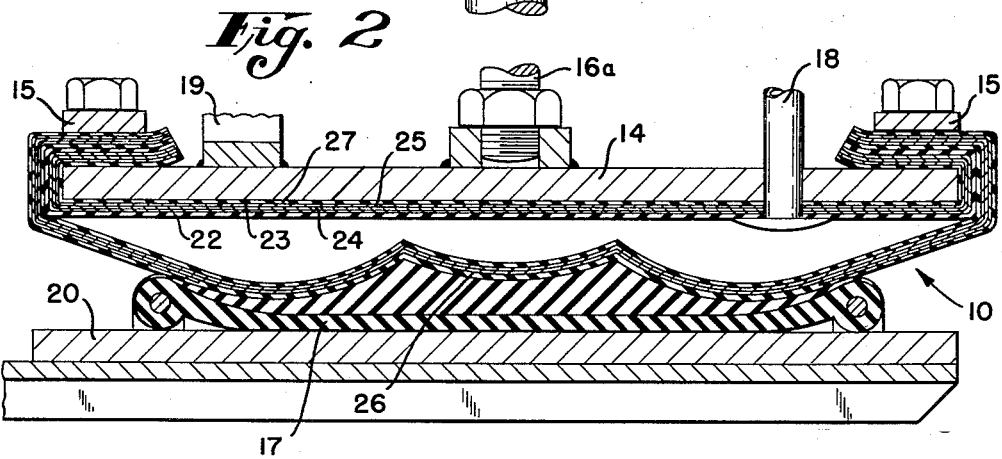
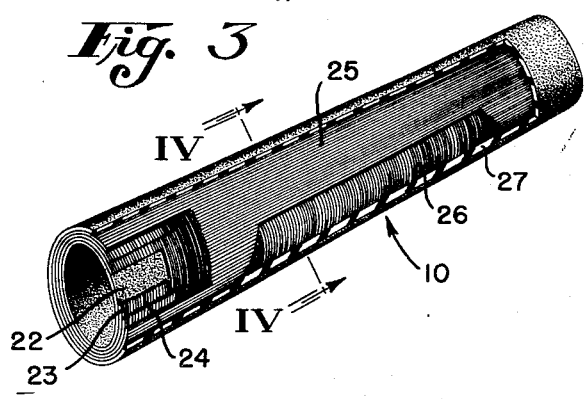
INVENTOR.
ERIC O. TOLONEN
BY
Irwin M. Lewis
ATTORNEY.

Aug. 8, 1961     E. O. TOLONEN     2,995,177
APPARATUS FOR SPLICING TIRE TREADS

Filed May 16, 1958     2 Sheets-Sheet 2

United States Patent Office 2,995,177
Patented Aug. 8, 1961

2,995,177
APPARATUS FOR SPLICING TIRE TREADS
Eric O. Tolonen, St. Clair Shores, Mich., assignor to United States Rubber Company, New York, N.Y., a corporation of New Jersey
Filed May 16, 1958, Ser. No. 735,763
4 Claims. (Cl. 154—9)

This invention relates to an apparatus for pressing the spliced area of the tread portion of a raw tire carcass.

In the production of a raw tire carcass, the cord plies are first wrapped around a tire building drum. The tread stock is then applied and the ends of the tread stock which have been previously skived are lapped and pressed together to form a splice. The quality of the splice in the finished tire is largely independent on uniformly pressing the splice in the raw tire across the full width thereof.

The problem of uniformly pressing the splice is aggravated by the fact that the tread stock (which includes stock for forming the sidewalls) is of varying thickness and uneven contour transversely across the tread.

It is the primary object of the present invention to furnish a relatively simple, inexpensive and efficient apparatus for applying uniform pressure to all sections of the tread splice area. It is a further object to avoid bridging any recessed portions of the tire tread contour while applying this pressure.

In accordance with the present invention these objects are achieved by use of a cord reinforced, inflatable, splice pressing bag, so constructed that the tread-contacting surface will assume the irregular transverse tread contour of the raw tire carcass while pressure is being applied to the splice. Specifically, this new splice pressing bag must be free to expand transversely to the tread, at least in that portion of the bag which contacts the splice, thus assuring that there will be no bridging and that a positive uniform pressure will be applied to the recessed areas.

These and other objects and details will become apparent from the description of the accompanying drawing which forms a part of this disclosure and in which like numerals refer to like parts.

FIG. 1 is a combined elevational and sectional view of my splice pressing bag used in conjunction with a turret type presser for tire tread splices;

FIG. 2 is an enlarged sectional view showing the bag in detail conforming to the irregular transverse contour of the uncured tire tread;

FIG. 3 is a perspective view of the tubular-shaped tire splice pressing bag before its installation on the turret type presser, the plies being broken away to show both the cord directions and the portion without longitudinal cords.

Figure 4:
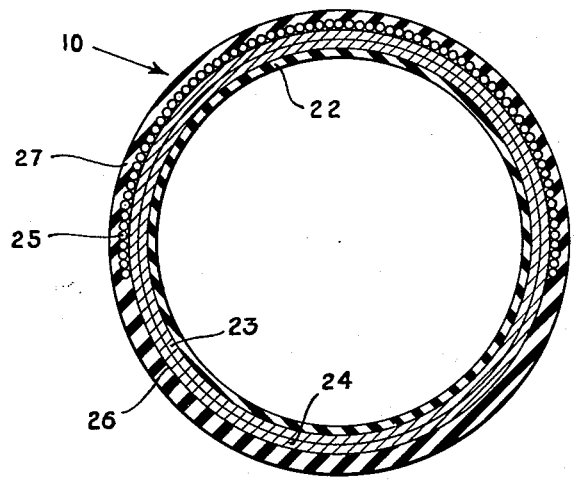
FIG. 4 is a sectional view taken on line 4—4 of FIG. 3.

Referring to the drawing and specifically to FIGS. 1 and 2, the pressing bag 10 is used on a turret type pressing unit 11 so designed as to have a loading and unloading station 12 and a pressing station 13. With this arrangement, one raw tire carcass may be unloaded and loaded during the interval the other raw tire carcass is being subjected to the splicing operation. In the preferred arrangement, each bag 10 is attached to a presser foot 14 by means of bolted clamping bars 15. The presser foot 14 is connected to the piston rod 16a of a fluid cylinder 16 for movably engaging the bag 10 with the tread of a tire carcass 17.

The bag 10 has a connection 18 for air permitting inflation to occur simultaneously with the downward movement of the piston. Thus, air to the bag 10 is taken from the top of the cylinder 16 so that the bag is inflated only when the splice area is loaded. The presser foot 14 has a guide 19 which stops the foot from rotating, thus keeping it in parallel relation to the anvil plate 20. The unit 11 is pivotally mounted on a center post 21.

The splice pressing bag 10 is itself constructed of a plurality of layers of cord fabric and rubber, these layers being positioned in a particular relationship and cord angle to each other. FIGS. 2, 3 and 4 show complete details. The bag is initially made in a tubular shape, and is preferably comprised of three plies of fabric with an inner and outer coating of rubber. In fabricating the structure, a layer of rubber 22 is applied to a conventional building form or mandrel. A single piece of cord fabric is then wrapped twice around the rubber layer 22 to form two plies 23 and 24 of 90° fabric, i.e., the cords of the fabric run circumferentially around the building form.

An outer restraining ply 25 of 180° fabric (cord line running longitudinally down the building form) is then constructed in such a manner that a portion 26 of the bag 10 is not restrained in the longitudinal direction. This is achieved by applying this layer 25 of longitudinally-oriented cord fabric to approximately one-half of the cylindrically shaped bag. (See FIGS. 3 and 4.) Thus, longitudinal strength is imparted to the tubular shaped bag only in that portion containing the ply 25. The portion 26, free of this longitudinal restraint, constitutes the tread-contacting surface of the bag. (See FIGS. 2 and 3.) An outer rubber layer 27 is then applied, and the entire construction is cured by conventional methods.

When mounted on the pressing unit 11, the ends of the completed bag 10 are folded up over the ends of the presser foot 14 and held in place by the clamping bars 15.

In operating my splice pressing bag, the raw tire carcass 17 is first laid over the anvil plate 20 so that the bag 10 can contact the splice area. Cylinder 16 actuates piston rod 16a to close presser foot 14 and simultaneously inflate bag 10 by means of connection 18. As the now-inflated bag 10 contacts the tread material, it assumes the irregular transverse contour, as shown in FIG. 2, thus applying uniform pressure to all areas. Since the bag is free to expand lengthwise in that portion which contacts the uneven portion of the tread, there is no bridging and a positive pressure is applied throughout.

The splice pressing bag 10 is inflated only while the press is being closed because tires could not be conveniently loaded and unloaded with air in the bag. The absence of the longitudinal restraining ply 25 in the portion 26 not only permits the pressing surface to assume the irregular transverse contour of the tread, but it also causes the bag to bulge in area 26 if it is inflated for any extended period of time while not in use. This bulging of the bag would create two production problems. First, the space between the bag pressing surface and the anvil plate 20 would be absorbed by the bulge to such an extent that loading would be almost impossible. And second, bag life would be greatly reduced, because of the absence of longitudinal restraint. This last factor could also result in a hazard due to actual bag blowouts in portion 26. Consequently, inflating the bag simultaneously with its downward movement eliminates these problems without impairing the efficiency of the actual splicing operation.

A press closing force of about 2,000 pounds with a bag inflation pressure of 35–40 p.s.i. has been found satisfactory. The press is held closed for about 1 minute for best results. When the pressure is released, the piston rod 16a retracts, the bag 10 is deflated and the tire 17 may be removed.

It will be understood that apparatus other than that particularly described may be employed in carrying out the concepts of my invention. Thus, although I have described one specific embodiment of my invention, other

Having thus described my invention, what I claim and desire to protect by Letters Patent is:

1. An apparatus for splicing the tread portion of a raw tire carcass, comprising an anvil plate for supporting the tire carcass, a presser foot mounted to move toward and away from said anvil plate, a flexible inflatable bag attached to said presser foot for applying pressure to the splice area of the tire tread, the longitudinal axis of said bag being parallel to the axis of said carcass, said bag being formed of cord fabric coated with a fluid impermeable composition, the individual cords of said cord fabric running in two substantially perpendicular directions in the non-tread-contacting portion of said bag, the tread-contacting portion of said bag having cords extending only in the direction perpendicular to said longitudinal axis of said bag, whereby said tread-contacting portion is free to expand in the direction transverse to said tread and to conform to the transverse tread contour when said bag is inflated and pressed against said splice area, and means for introducing fluids under pressure into said bag to inflate and expand said bag simultaneously with the application of pressure to said splice area.

2. An apparatus for splicing the tread portion of a raw tire carcass, comprising an anvil plate for supporting the tire carcass, a presser foot mounted to move toward and away from said anvil plate, a flexible inflatable bag attached to said presser foot for applying pressure to the splice area of the tire tread, the longitudinal axis of said bag being placed parallel to the axis of said carcass, said bag being formed of at least one ply of cord fabric coated with a flexible, fluid-impermeable composition, the individual cords of said ply extending perpendicularly to said longitudinal axis of said bag, another ply only in the non-tread-contacting portion of said bag, the individual cords of said other ply running substantially perpendicularly to said cords of said first ply and parallel to said longitudinal axis of said bag, whereby the tread-contacting portion of said bag is free to expand in a direction transverse to said tread and to conform to the transverse tread contour when said bag is inflated and pressed against said splice area, and means carried by the outer wall of said bag for introducing fluids under pressure into said bag to inflate and expand said bag simultaneously with the application of pressure to said splice area.

3. An apparatus for splicing the tread portion of a raw tire carcass, comprising an anvil plate over which said tire carcass is placed, a presser foot mounted to move toward and away from said anvil plate, a cylindrical flexible inflatable bag for applying pressure to the splice area of the tire tread, the longitudinal axis of said bag being placed parallel to the axis of said carcass, the terminal ends of said bag being fastened to opposed ends of said presser foot, said bag being formed of at least two plies of cord fabric coated with a flexible, fluid-impermeable composition, the individual cords of said two plies extending perpendicularly to said longitudinal axis of said bag, a third ply only in the non-tread-contacting portion of said bag, the individual cords of said third ply running substantially perpendicularly to said cords of said first two plies and parallel to said longitudinal axis of said bag, whereby the tread-contacting portion of said bag is free to expand in a direction transverse to said tread and to conform to the transverse tread contour when said bag is inflated and pressed against said splice area, a piston rod connected to said presser foot, a fluid cylinder to actuate said piston rod and to bring said bag into pressure engagement with said splice area, and means carried by the outer wall of said bag for introducing fluids under pressure into said bag to inflate and expand said bag simultaneously with the application of pressure to said splice area.

4. An apparatus for splicing the tread portion of a raw tire carcass as described in claim 3, in which said individual cords of said first two plies extend circumferentially around said cylindrical flexible inflatable bag, and in which said individual cords of said third ply extend substantially longitudinally along said cylindrical flexible inflatable bag.

References Cited in the file of this patent

UNITED STATES PATENTS

| | | |
|---|---|---|
| 1,162,745 | Blodgett | Dec. 7, 1915 |
| 1,213,735 | Brown | Jan. 23, 1917 |
| 1,236,534 | Blodgett | Aug. 14, 1917 |
| 1,588,585 | Kearns | June 15, 1926 |
| 1,786,499 | Maynard | Dec. 30, 1930 |
| 1,983,705 | Pilblad et al. | Dec. 11, 1934 |
| 2,066,085 | Whistler | Dec. 29, 1936 |
| 2,582,715 | Murray | Jan. 15, 1952 |
| 2,678,468 | Smith | May 18, 1954 |
| 2,699,194 | Iknayan | Jan. 11, 1955 |
| 2,712,339 | Hurt | July 5, 1955 |
| 2,839,440 | Pfeiffer et al. | June 17, 1958 |